(12) United States Patent
Oonuki

(10) Patent No.: US 9,614,758 B2
(45) Date of Patent: Apr. 4, 2017

(54) COMMUNICATION SYSTEM, INTEGRATED CONTROLLER, PACKET FORWARDING METHOD AND PROGRAM

(71) Applicant: NEC Corporation, Minato-ku, Tokyo (JP)

(72) Inventor: Satoshi Oonuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/767,675

(22) PCT Filed: Mar. 6, 2014

(86) PCT No.: PCT/JP2014/055754
§ 371 (c)(1),
(2) Date: Aug. 13, 2015

(87) PCT Pub. No.: WO2014/136867
PCT Pub. Date: Sep. 12, 2014

(65) Prior Publication Data
US 2016/0006652 A1    Jan. 7, 2016

(30) Foreign Application Priority Data

Mar. 7, 2013 (JP) .................................. 2013-045263

(51) Int. Cl.
*H04L 12/28* (2006.01)
*H04L 12/713* (2013.01)
(Continued)

(52) U.S. Cl.
CPC ........ *H04L 45/586* (2013.01); *H04L 41/0826* (2013.01); *H04L 41/12* (2013.01); *H04L 45/64* (2013.01)

(58) Field of Classification Search
CPC ... H04L 45/586; H04L 41/0826; H04L 41/12; H04L 45/64
See application file for complete search history.

(56) References Cited

U.S. PATENT DOCUMENTS

2011/0317701 A1* 12/2011 Yamato .................. H04L 49/25
  370/392
2012/0076150 A1*  3/2012 Perlman .............. H04L 12/4641
  370/395.53
(Continued)

FOREIGN PATENT DOCUMENTS

WO    2011083780 A1    7/2011

OTHER PUBLICATIONS

Nick McKeown et al."OpenFlow: Enabling Innovation in Campus Networks" Mar. 14, 2008.
(Continued)

*Primary Examiner* — Ian N Moore
*Assistant Examiner* — Lakeram Jangbahadur

(57) ABSTRACT

A communication system includes a first switch that exchanges information with a neighboring switch by a preset routing protocol to form a forwarding table and that references the forwarding table to forward a packet. The communication system also includes a second switch that forwards the packet in accordance with an instruction from a preset controller, the controller that gives the instruction to the second switch, and an integrated controller. The integrated controller instructs the controller to forward the packet along a path specified for the second switch and to generate a virtual network formed by a virtualized switch as the first switch. The information is exchanged between the second switch mapped to the virtual network and the first switch by the preset routing protocol to cause the packet to be forwarded along a pre-calculated path.

11 Claims, 15 Drawing Sheets

(51) Int. Cl.
*H04L 12/715* (2013.01)
*H04L 12/24* (2006.01)

(56) References Cited

U.S. PATENT DOCUMENTS

2013/0010600 A1   1/2013   Jocha et al.
2013/0194914 A1*  8/2013   Agarwal ............... H04L 45/245
                                              370/225

OTHER PUBLICATIONS

"OpenFlow Switch Specication", Version 1.0.0 ( Wire Protocol 0x01 ), Dec. 31, 2009.
"Transparent Interconnection of Lots of Links(TRILL)", retrieved on Feb. 23, 2013.
Hideki Tanabe et al., "Technical trend and interoperability issue of data center network",IEICE Technical Report, Jan. 11, 2012(Jan. 11, 2012), vol. 111, No. 375, p. 47. English Abstract.
International Search Report for PCT Application No. PCT/JP2014/055754, mailed on May 27, 2014.
Extended European Search Report for EP Application No. EP14760459.9 dated on Oct. 19, 2016.

* cited by examiner

FIG. 5

| LINKS | | LINK COSTS |
|---|---|---|
| OpenFlow SWITCH 40-1 | OpenFlow SWITCH 40-3 | 10 |
| OpenFlow SWITCH 40-1 | OpenFlow SWITCH 40-4 | 1000 |
| OpenFlow SWITCH 40-2 | OpenFlow SWITCH 40-3 | 1000 |
| OpenFlow SWITCH 40-2 | OpenFlow SWITCH 40-4 | 10 |
| OpenFlow SWITCH 40-3 | OpenFlow SWITCH 40-5 | 10 |
| OpenFlow SWITCH 40-3 | OpenFlow SWITCH 40-6 | 100 |
| OpenFlow SWITCH 40-3 | OpenFlow SWITCH 40-7 | 1000 |
| OpenFlow SWITCH 40-4 | OpenFlow SWITCH 40-5 | 1000 |
| OpenFlow SWITCH 40-4 | OpenFlow SWITCH 40-6 | 100 |
| OpenFlow SWITCH 40-4 | OpenFlow SWITCH 40-7 | 10 |

FIG. 6

| LINKS | | LINK COSTS |
|---|---|---|
| OpenFlow SWITCH 40-5 | TRILL SWITCH 50-1 | 100 |
| OpenFlow SWITCH 40-6 | TRILL SWITCH 50-2 | 100 |
| OpenFlow SWITCH 40-7 | TRILL SWITCH 50-3 | 100 |
| TRILL SWITCH 50-4 | TRILL SWITCH 50-1 | 10 |
| TRILL SWITCH 50-4 | TRILL SWITCH 50-2 | 100 |
| TRILL SWITCH 50-4 | TRILL SWITCH 50-3 | 1000 |
| TRILL SWITCH 50-5 | TRILL SWITCH 50-1 | 1000 |
| TRILL SWITCH 50-5 | TRILL SWITCH 50-2 | 100 |
| TRILL SWITCH 50-5 | TRILL SWITCH 50-3 | 10 |

FIG. 9

| LINKS | | LINK COSTS |
|---|---|---|
| VIRTUAL TRILL SWITCH 60-1 | VIRTUAL TRILL SWITCH 60-3 | 20 |
| VIRTUAL TRILL SWITCH 60-1 | VIRTUAL TRILL SWITCH 60-4 | 110 |
| VIRTUAL TRILL SWITCH 60-1 | VIRTUAL TRILL SWITCH 60-5 | 1100 |
| VIRTUAL TRILL SWITCH 60-2 | VIRTUAL TRILL SWITCH 60-3 | 1100 |
| VIRTUAL TRILL SWITCH 60-2 | VIRTUAL TRILL SWITCH 60-4 | 110 |
| VIRTUAL TRILL SWITCH 60-2 | VIRTUAL TRILL SWITCH 60-5 | 20 |

FIG. 10

| LINKS | | LINK COSTS |
|---|---|---|
| OpenFlow SWITCH 40-1 | OpenFlow SWITCH 40-3 | 10 |
| OpenFlow SWITCH 40-1 | OpenFlow SWITCH 40-4 | 1000 |
| OpenFlow SWITCH 40-2 | OpenFlow SWITCH 40-3 | 1000 |
| OpenFlow SWITCH 40-2 | OpenFlow SWITCH 40-4 | 10 |
| OpenFlow SWITCH 40-3 | OpenFlow SWITCH 40-5 | 10 |
| OpenFlow SWITCH 40-3 | OpenFlow SWITCH 40-6 | 100 |
| OpenFlow SWITCH 40-3 | OpenFlow SWITCH 40-7 | 1000 |
| OpenFlow SWITCH 40-4 | OpenFlow SWITCH 40-5 | 10 |
| OpenFlow SWITCH 40-4 | OpenFlow SWITCH 40-6 | 100 |
| OpenFlow SWITCH 40-4 | OpenFlow SWITCH 40-7 | 1000 |

FIG. 13

| LINKS | | LINK COSTS |
|---|---|---|
| VIRTUAL TRILL SWITCH 70-1 | VIRTUAL TRILL SWITCH 70-3 | 10 |
| VIRTUAL TRILL SWITCH 70-1 | VIRTUAL TRILL SWITCH 70-4 | 100 |
| VIRTUAL TRILL SWITCH 70-1 | VIRTUAL TRILL SWITCH 70-5 | 1000 |

COMMUNICATION SYSTEM, INTEGRATED CONTROLLER, PACKET FORWARDING METHOD AND PROGRAM

REFERENCE TO RELATED APPLICATION

The present application is a National Stage Entry of PCT/2014/055754 filed Mar. 6, 2014, which is based on and claims the benefit of the priority of Japanese Patent Application No. 2013-045263, filed on Mar. 7, 2013, the disclosures of all of which are incorporated herein in their entirety by reference.

TECHNICAL FIELD

This invention relates to a communication system, an integrated controller, a method for forwarding a packet and a program and, more particularly, to a communication system, an integrated controller, a method for forwarding a packet and a program, which are configured to control respectively a centralized control network and an autonomous control network.

BACKGROUND

These days, a technique known as OpenFlow has been proposed (see Non-Patent Literatures 1 and 2). In the OpenFlow, the packet forwarding function and the path control function are separated from each other, such that a network apparatus takes charge of the packet forwarding function, while a controller provided outside the network apparatus takes charge of the control function. In this manner, control from outside becomes easier, thus enabling construction of a network which is high in flexibility.

FIG. 14 shows a basic example configuration of the OpenFlow 1.0.0. Specifically, FIG. 14 shows a switch as an example network apparatus. The OpenFlow is made up of a network apparatus(es) that supports an OpenFlow protocol and a controller placed outside. The network apparatus(es) is connected with the controller via a secure channel and communicates with the controller in accordance with the OpenFlow protocol. In the OpenFlow, packet forwarding by the network apparatus(es) and path control are separated from each other, such that the network apparatus performs packet forwarding, while the controller manages path control for the network apparatus(es). More specifically, the controller sets flow entries, in which match conditions (Header Field of FIG. 14), statistics information (Counter of FIG. 14) and the processing contents (Actions of FIG. 14) are correlated one with another, in the switch (network apparatus). The switch searches the flow entries so set therein for such flow entry having the match conditions matching a received packet. If the matching entry is found, the switch applies the entry's processing contents (Actions of FIG. 14) to the received packet.

On the other hand, a technique termed 'TRILL' has been proposed as a method for constructing a network that is high in flexibility (Non-Patent Literature 3). In TRILL, the network apparatus has both the function of packet forwarding and the function of path control. TRILL encapsulates an Ethernet (registered trademark) frame received by another Ethernet frame and adds a new destination MAC address (Media Access Control Address), a source MAC address and a VLAN tag. Moreover, TRILL adds a unique TRILL header storing the information concerning an ingress switch as well as an egress switch.

Referring to FIG. 15, processing flow by TRILL will be shown.

(1) A TRILL switch A receives a packet from a node A. The TRILL switch A searches a forwarding table to check for nicknames of an ingress RBridge (Routing Bridge) and an egress RBridge, based on the original Ethernet header information. The TRILL switch A adds a TRILL header in which the nicknames of the above mentioned RBridges are set, and encapsulates the packet with a new Ethernet header to transmit the packet encapsulated to a TRILL switch B which is the next hop.

(2) The TRILL switch B searches its forwarding table and modifies the destination MAC address as well as the source MAC address of the Ethernet header to transmit the packet to a TRILL switch D which is the next hop.

(3) The TRILL switch D searches its forwarding table. If the switch D finds that the node B as the destination is connected under its control, the switch strips off the TRILL header and the Ethernet header disposed on an outer side to transmit the resulting packet to the node B.

TRILL uses the IS-IS (Intermediate System to Intermediate System) to generate the forwarding table. The TRILL switches exchange IS-IS packets with one another to generate a forwarding table.

Non-Patent Literature 1: Nick McKeown and seven others, "OpenFlow: Enabling Innovation in Campus Networks", [online], retrieved on February 23, Heisei25 (2013), Internet <URL:http://www.openflow-org/documents/openflow-wp-latest.pdf>

Non-Patent Literature 2: "OpenFlow Switch Specification" Version 1.0.0 (Wire Protocol 0x01), [online], Retrieved on February 23, Heisei25 (2013), Internet <URL:http://www.openflow.org/documents/openflow-spec-v1.0.0.pdf>

Non-Patent Literature 3: "Transparent Interconnection of Lots of Links (TRILL)", [online], [Retrieved on February 23, Heisei25 (2013)], Internet URL:http://datatracker.ietf.org/wg/TRILL/SUMMARY The following analysis is given by the present invention. The OpenFlow controller of Non-Patent Literatures 1, 2 calculates forwarding paths, based on link costs of OpenFlow switches, and set flow entries (control information) on the OpenFlow switches disposed on a path of the least cost. These flow entries (control information) carry out the forwarding along the so calculated path. At this time, the OpenFlow controller is unable to collect the information on the topology or link costs of the switch or switches that are not under its control and that are OpenFlow incompatible. Hence, such switch or switches may, of course, not be used for path calculations.

On the other hand, the TRILL (Transparent Interconnect of Lots of Links) switches exchange the link cost information between each other. Each TRILL switch autonomously calculates a path(s) and uses the path of the least cost down to the packet's destination.

Such a configuration including an OpenFlow network and a TRILL network lying adjacent to each other, in which each of the OpenFlow and TRILL networks includes a plurality of neighboring points, there being a plurality of paths down to the packet's destination, as shown in FIG. 2, will now be considered. The OpenFlow controller is unable to get the information on the topology or the link costs in the TRILL network and hence is unable to use the TRILL network information for path control. On the other hand, the TRILL switch is unable to get the information on the topology or the link costs in the OpenFlow network and hence is unable to use the OpenFlow network information for path control.

Such a method may be thought of in which a TRILL switch(es) is created using a software technique within the OpenFlow controller so as to cause the OpenFlow network in its entirety to operate as a single TRILL switch. However, with the method of causing the OpenFlow network to operate in its entirety as a single TRILL switch, there are cases where the least cost path cannot be selected.

A specific example will now be illustrated by referring to FIG. 4 to FIG. 7. FIG. 4 shows a physical topology and FIG. 5, while FIG. 6 show link costs between two of the switches of FIG. 4. Referring to FIG. 4, the least cost path from the node C up to the node A is [node C→TRILL switch 50-4→TRILL switch 50-1→OpenFlow switch 40-5→OpenFlow switch 40-3→OpenFlow switch 40-1→node A]. The least cost path from the node C up to the node B is [node C→TRILL switch 50-4→TRILL switch 50-2→OpenFlow switch 40-6→OpenFlow switch 40-4→OpenFlow switch 40-2→node B]. These least cost paths are shown in FIG. 7.

If, in FIG. 4, the OpenFlow network is deemed to be a single TRILL switch, the least cost path from the node C up to the node B is [node C→TRILL switch 50-4→TRILL switch 50-1→OpenFlow switch 40-5], which path differs from the inherent least cost path.

It is an object of the present invention to provide a communication system, an integrated controller, a method for forwarding a packet and a program, contributing to providing a path controlling means in an environment of interconnection of a network forwarding a packet along a route specified from an upper order apparatus and a network managing autonomous path control.

In a first aspect, the present invention provides a communication system comprising a first switch(es) that exchanges information with a neighboring switch(es) by a preset routing protocol to form a forwarding table and that references the so formed forwarding table to forward a packet. The communication system also comprises a second switch(es) that forwards the packet in accordance with an instruction from a preset controller, the controller that gives the instruction to the second switch(es), and a integrated controller. The integrated controller instructs the controller to forward the packet along a path specified for the second switch(es) and to generate a virtual network constituted by a virtualized switch(es) as the first switch(es). The integrated controller causes information exchange to be performed between the second switch(es) mapped to the virtual network and the first switch(es) by the preset routing protocol to cause the packet to be forwarded along a pre-calculated path.

In a second aspect, there is provided a integrated controller connected to a first switch(es) that exchanges information with a neighboring switch(es) by a preset routing protocol to form a forwarding table and that references the so formed forwarding table to forward a packet, a second switch(es) forwarding the packet under an instruction from a preset controller and to the preset controller instructing the second switch(es). Based on the information collected from the first and second switches, the integrated controller instructs the controller to forward a packet on a path specified for the second switch(es) and to generate a virtual network constituted by a virtualized switch(es) as the first switch(es). The integrated controller causes information exchange to be performed by the preset routing protocol between the first switches and the second switches mapped to the virtual network so as to cause the packet to be forwarded along a pre-calculated path.

In a third aspect, there is provided a method for forwarding a packet comprising instructing a controller, which instructs a second switch(es), to forward a packet on a path specified for the second switch(es) and to generate a virtual network. A first switch(es) that exchanges information with a neighboring switch(es) by a preset routing protocol to form a forwarding table and that references the forwarding table to forward a packet, forms a network, and the second switch(es), forwarding the packet under an instruction from the controller, forms the network. The virtual network is constituted by a virtualized switch(es) as the first switch(es). The method also comprises causing information exchange to be performed by the preset routing protocol between the first switch(es) and the second switch(es) mapped to the virtual network so as to cause the packet to be forwarded along a pre-calculated path. The present method is bound up with a particular machine which is a integrated controller that controls the above mentioned network management apparatus and the above mentioned controller.

In a fourth aspect, there is provided a program that causes a computer, which instructs a controller, controlling a second switch(es), to perform a processing of instructing the second switch(es) to forward a packet along a specified path and to generate a virtual network. A first switch(es) exchanging information with a neighboring switch(es) by a preset routing protocol to form a forwarding table and referencing the forwarding table to forward a packet, forms a network, and the second switch(es), forwarding the packet under an instruction from the controller, forms the network. The virtual network is constituted by a virtualized switch(es) as the first switch(es). The program also causes the computer to perform a processing of causing the information to be exchanged between the first switch(es) and the second switch(es) mapped to the virtual network by the preset protocol so as to cause the first and second switches to forward the packet along a pre-calculated path. By the way, the program can be recorded on a computer-readable (non-transient) recording medium. Viz., the present invention can be implemented as a computer program product.

According to the present invention, it is possible to contribute to providing a path control means in an environment of interconnection of a network forwarding a packet along a route specified from an upper order apparatus and a network exercising autonomous path control (enriching or plenitude enhancement).

BRIEF DESCRIPTION OF THE DRAWINGS

FIG. 5 is a tabular view showing link costs between respective ones of OpenFlow switches of FIG. 4.

FIG. 6 is a tabular view showing link costs between the OpenFlow switches of FIG. 4 and the TRILL switches.

FIG. 9 is a tabular view showing link costs between respective ones of the virtual TRILL switches of FIG. 7.

FIG. 10 is another tabular view showing link costs between respective ones of the OpenFlow switches of FIG. 4.

FIG. 13 is a tabular view showing link costs between respective ones of the virtual TRILL switches of FIG. 10.

PREFERRED MODES

A preferred mode of the present invention will now be summarized with reference to the drawings. It is noted that symbols are entered in the summary merely as examples to assist in understanding and are not intended to limit the present invention to the mode illustrated.

Figure 1:
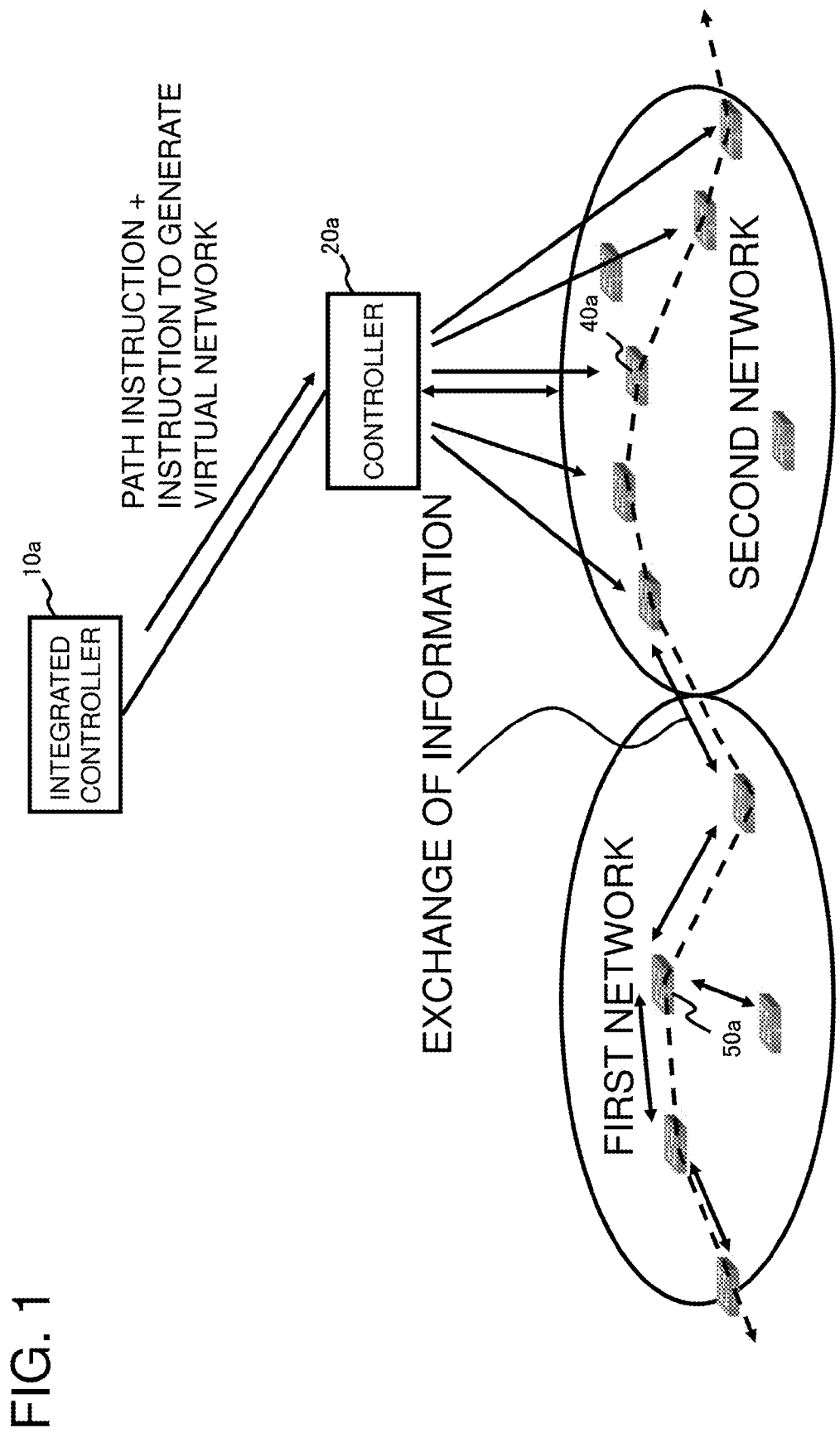
FIG. 1 is a schematic view showing a configuration of an exemplary embodiment.

The configuration of an exemplary embodiment of the present disclosure may be implemented by first switches 50a, second switches 40a, a controller 20a and an integrated controller 10a, as shown in FIG. 1. The first switch 50a exchanges information with a neighboring switch or switches to form a forwarding table and refers to the so formed forwarding table to forward the packet. The second switches 40a forward the packet under instructions given by the controller 20a. More specifically, the integrated controller 10a instructs the controller 20a to forward a packet along a path specified for the switches 40a and to generate a virtual network constituted by virtualized switches as the first switches 50a. The controller 20a causes the information to be exchanged between the second switches 40a mapped to the virtual network and the first switches 50a using the above mentioned routing protocol so as to forward the packet along a pre-calculated route.

In this manner, the packet may be forwarded along an optional route astride the first and second networks. The reason is that, based on the instruction from the integrated controller 10a, the controller 20a instructs the second switches 40a to forward the packet along a specified route, while causing the second switches 40a to run as virtual first switches to exchange the information concerning the route with the first switch 50a.

Exemplary Embodiment 1

Figure 2:
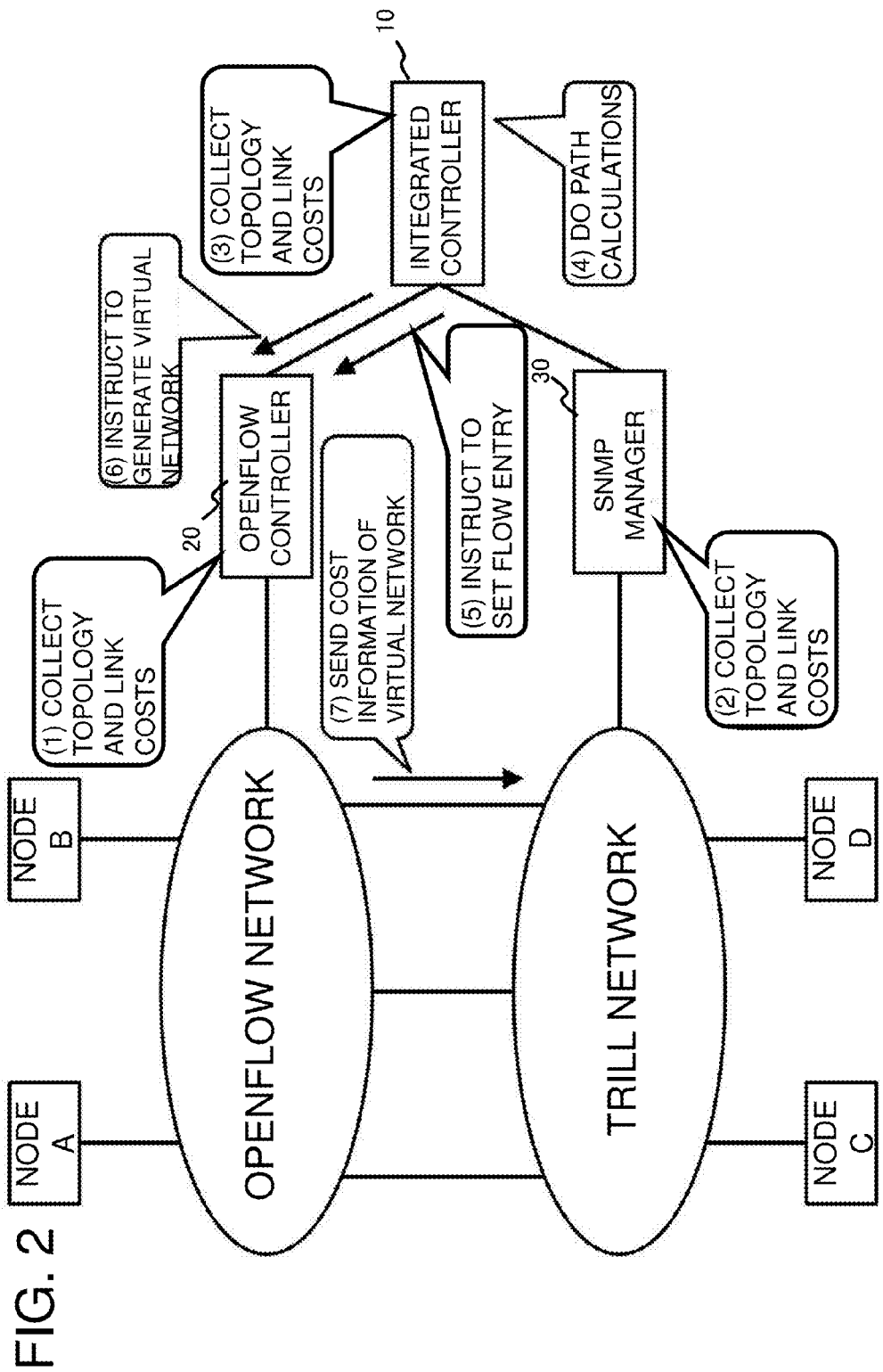
FIG. 2 is a block diagram showing schemata of the operation of a communication system according to an exemplary embodiment 1.

An exemplary embodiment 1 will now be explained in detail with reference to the drawings. FIG. 2 is a schematic block diagram for explaining the schemata of the operation of a communication system according to the exemplary embodiment 1. FIG. 2 shows a configuration including an OpenFlow controller 20, a SNMP (Simple Network Management Protocol) manager 30, an integrated controller 10 and a TRILL network. The OpenFlow controller 20 acts on contents of a flow table owned by the OpenFlow switch to control the OpenFlow switch. The SNMP manager 30 collects the information concerning the TRILL network and is equivalent to the network management apparatus. The integrated controller 10 controls the OpenFlow controller 20 and the SNMP manager 30. The OpenFlow switches are arranged in the OpenFlow network, while TRILL switches are arranged in the TRILL network.

(1) The OpenFlow controller 20 collects the link cost information as well as the topological information from the OpenFlow switches so as to store the information collected in a database.

(2) The SNMP manager 30 acquires the link cost information as well as the topological information from the TRILL switches to store the so collected information in a database.

(3) The integrated controller 10 acquires the link cost information as well as the topological information of the OpenFlow controller 20, while acquiring the topological information, link cost information and the server information of the TRILL network from the SNMP manager 30. The integrated controller 10 causes the information acquired to be stored in a database.

(4) The integrated controller 10 calculates, from the information stored in the database, a least cost route between the node A (or the node B) and the node C (or the node D).

(5) The integrated controller 10 instructs the OpenFlow controller 20 to set a flow that accomplishes communication using the least cost route. In accordance with the instruction from the integrated controller, the OpenFlow controller 20 sets, on the OpenFlow switches on the least cost route, such a flow entry that allows a packet to be forwarded along the above mentioned least cost route.

(6) The integrated controller 10 instructs the OpenFlow controller 20 to generate a virtual network. In accordance with the instruction from the integrated controller, the OpenFlow controller generates a virtual network in which one or more OpenFlow switches are replaced by a TRILL switch or switches and in which no link cost change is incurred.

(7) The OpenFlow controller 20 instructs the OpenFlow switch to send the link cost information of the virtual network thereto. The OpenFlow switch sends the information concerning the virtual network to the TRILL switch. The TRILL switch recognizes the virtual network as a TRILL network to perform path calculations.

Figure 3:
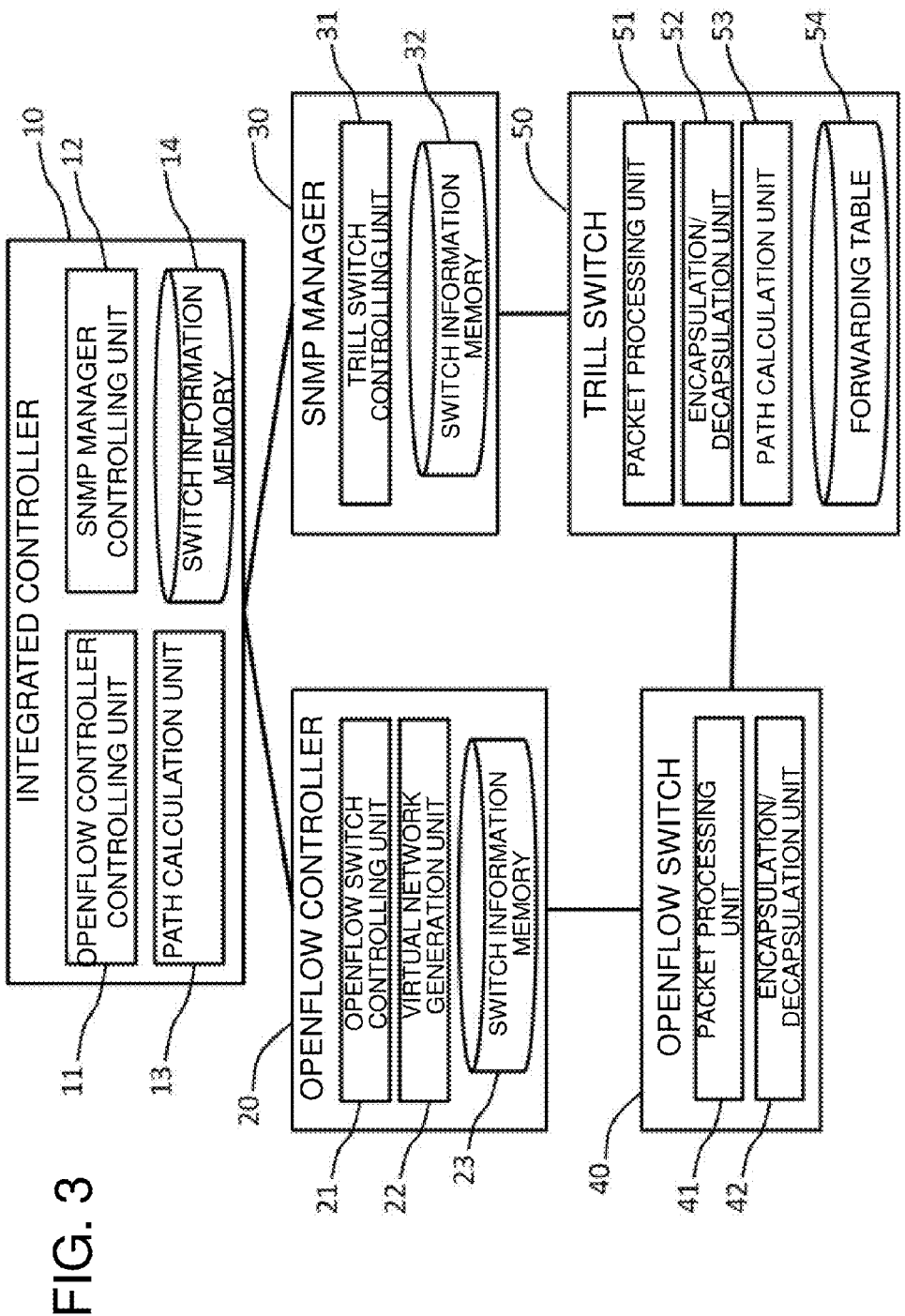
FIG. 3 is a block diagram showing a configuration of a communication system according to the exemplary embodiment 1.

Referring to FIG. 3, the detailed configuration of each of apparatuses making up the above mentioned communication system will be explained. FIG. 3 depicts a block diagram showing the configuration of a communication system according to the exemplary embodiment 1. Referring to FIG. 3, there is shown a configuration of interconnections of the integrated controller 10, OpenFlow controller 20, SNMP manager 30, OpenFlow switch 40 and the TRILL switch 50.

The integrated controller 10 includes an OpenFlow controller controlling unit 11, a SNMP manager controlling unit 12, a path calculation unit 13 and a switch information memory 14. The integrated controller 10 may be constructed by a server machine or a virtual machine running on the server machine. The integrated controller 10 is connected to the OpenFlow controller 20 or to the SNMP manager 30 over a leased line or an ordinary network. By the way, in the examples of FIG. 2 or FIG. 3, one OpenFlow controller 20 and one SNMP manager 30 are used. However, the integrated controller 10 is able to manage a plurality of OpenFlow controllers and a plurality of SNMP managers.

The OpenFlow controller controlling unit 11 controls the OpenFlow controller 20 over a network. The SNMP manager controlling unit 12 controls the SNMP manager 30 over another network. The path calculation unit 13 calculates paths between two of the nodes shown in FIG. 4. The switch information memory 14 stores the information on the topologies or the link costs acquired from the OpenFlow controller 20 and the SNMP manager 30.

The OpenFlow controller 20 includes an OpenFlow switch controlling unit 21, a virtual network generation unit 22 and a switch information memory 23. Such OpenFlow controller 20 may be constructed by a server machine or a virtual machine running on the server machine. The OpenFlow controller 20 may be run on the same machine as that of the integrated controller 10. The OpenFlow controller 20 may supervise a plurality of OpenFlow switches, and is connected to the OpenFlow switch over a secure channel formed using a leased line or an ordinary network.

The OpenFlow switch controlling unit 21 controls the OpenFlow switch 40 by modifying the contents of the flow table of the OpenFlow switch over the secure channel. In accordance with the instructions from the integrated controller 10, the virtual network generation unit 22 generates a virtual network that reflects link costs between respective ones of the OpenFlow switches (see FIG. 8 and FIG. 12). The switch information memory 23 stores the information acquired from the OpenFlow switch 40.

The SNMP manager 30 includes a TRILL switch controlling unit 31 and a switch information memory 32. Such SNMP manager 30 may be constructed by a server machine or a virtual machine running on the server machine. The SNMP manager 30 may be run on the same machine as that of the integrated controller 10. The SNMP manager 30 may supervise a plurality of TRILL switches, using SNMP, and is connected to the TRILL switches using a leased line or an ordinary network.

The TRILL switch controlling unit 31 controls the TRILL switch 50 over a network. The switch information memory 32 stores the information acquired from the TRILL switch 50.

The OpenFlow switch 40 includes a packet processing unit 41 and an encapsulation/decapsulation unit 42.

The packet processing unit 41 references the flow entry (control information) that has been set in a flow table, not shown, to forward a received packet to a physical port of the OpenFlow switch 40 or to the OpenFlow controller 20. The encapsulation/decapsulation unit 42 adds a TRILL header to a packet passed to or from a TRILL switch side port, while also stripping the TRILL header from the same packet passed to or from the same TRILL switch side port.

The TRILL switch 50 includes a packet processing unit 51, an encapsulation/decapsulation unit 52, a path calculation unit 53 and a forwarding table 54.

On receipt of a packet from a physical port of the TRILL switch 50 or from the SNMP manager 30, the packet processing unit 51 references the forwarding table 54 to transmit the packet to the physical port of the TRILL switch 50 or to the SNMP manager 30. The encapsulation/decapsulation unit 52 adds or strips off the TRILL header by way of encapsulation/decapsulation. The path calculation unit 53 calculates a path within a network to store the path information in the forwarding table 54. The forwarding table 54 stores the path information.

By the way, the integrated controller 10, OpenFlow controller 20 and the SNMP manager 30 shown in FIG. 3, these being processing means, may be implemented on a computer by a computer program, using the computer's hardware resources, with the computer then constituting these processing means.

The operation of the subject exemplary embodiment will now be explained in detail with reference to the drawings. In the explanation to follow, the operation of the subject exemplary embodiment will be explained in detail using the network topology shown in FIG. 4. It is presumed that the values shown in FIG. 5 and FIG. 6 have been obtained for the link costs between respective switches. FIG. 5 depicts a table showing link costs incurred between two of the total of the OpenFlow switches shown in FIG. 4, while FIG. 6 shows a table illustrating link costs incurred between the OpenFlow switches and the TRILL switches of FIG. 4.

The OpenFlow controller 20 acquires the topological information and the link cost information from the OpenFlow switches 40-1 to 40-7, the OpenFlow controller is keeping under control, and stores the two sorts of the information in the switch information memory 23 (see FIG. 2(1)).

The SNMP manager 30 acquires the topological information and the link cost information from the TRILL switches 50-1 to 50-5, the SNMP manager is keeping under control, and stores the two sorts of the information in the switch information memory 32 (see FIG. 2(2)).

The integrated controller 10 acquires the topological information and the link cost information, stored in the OpenFlow controller 20 and the SNMP manager 30, and stores the two sorts of the information in the switch information memory 14 (see FIG. 2(3)).

Figure 7:
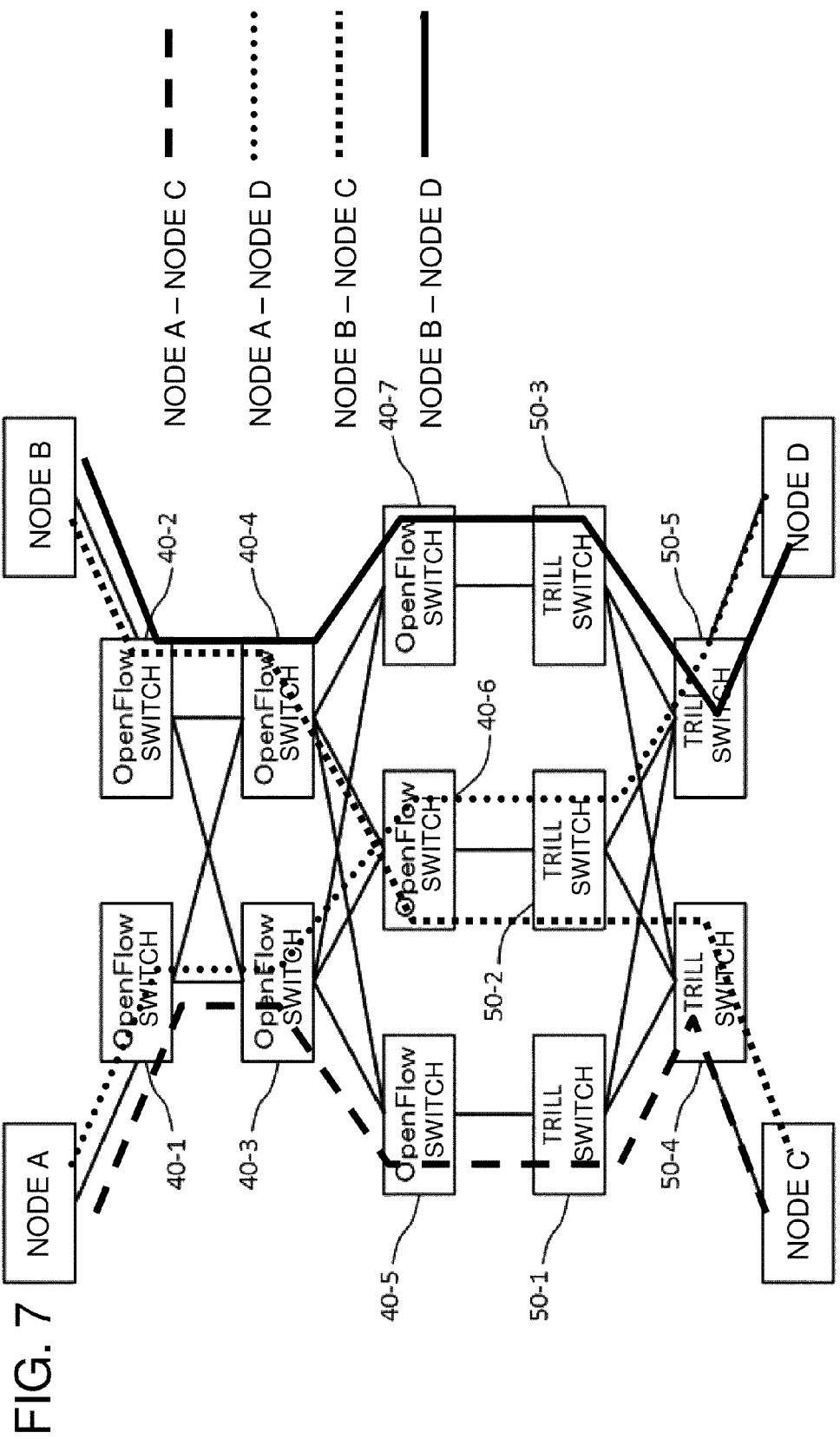
FIG. 7 is a block diagram, shown overlaid on FIG. 4 and showing the least cost paths between nodes derived from the link costs of FIG. 6.

The path calculation unit 13 calculates least cost paths between edge switches based on the information stored in the switch information memory 14 (see FIG. 2(4)). If the link costs of FIG. 5 and FIG. 6 are used, the least cost path from the OpenFlow switch 40-1 to the TRILL switch 50-4 is [OpenFlow switch 40-1→OpenFlow switch 40-3→OpenFlow switch 40-5→TRILL switch 50-1→TRILL switch 50-4]. Similarly, the least cost path from the OpenFlow switch 40-1 to the TRILL switch 50-5 is [OpenFlow switch 40-1→OpenFlow switch 40-3→OpenFlow switch 40-6→TRILL switch 50-2→TRILL switch 50-5] (see FIG. 7).

The least cost path from the OpenFlow switch 40-2 to the TRILL switch 50-4 is [OpenFlow switch 40-2→OpenFlow switch 40-4→OpenFlow switch 40-6→TRILL switch 50-2→TRILL switch 50-4]. The least cost path from the OpenFlow switch 40-2 to the TRILL switch 50-5 is [OpenFlow switch 40-2→OpenFlow switch 40-4→OpenFlow switch 40-7→TRILL switch 50-3→TRILL switch 50-5] (see FIG. 7).

The OpenFlow controller controlling unit 11 instructs the OpenFlow controller 20 to set a flow entry (control information) to cause the OpenFlow switch 40 to forward a packet along a path calculated by the path calculation unit 13 (see FIG. 2(5)). The OpenFlow switch controlling unit 21 of the OpenFlow controller 20 sets a flow entry in the OpenFlow switch 40 in accordance with an instruction received from the integrated controller 10. For example, a flow entry (control information) for forwarding the packet in question along an arrow line is set in each of the OpenFlow switches located on each shortest path shown in FIG. 7.

Figure 8:
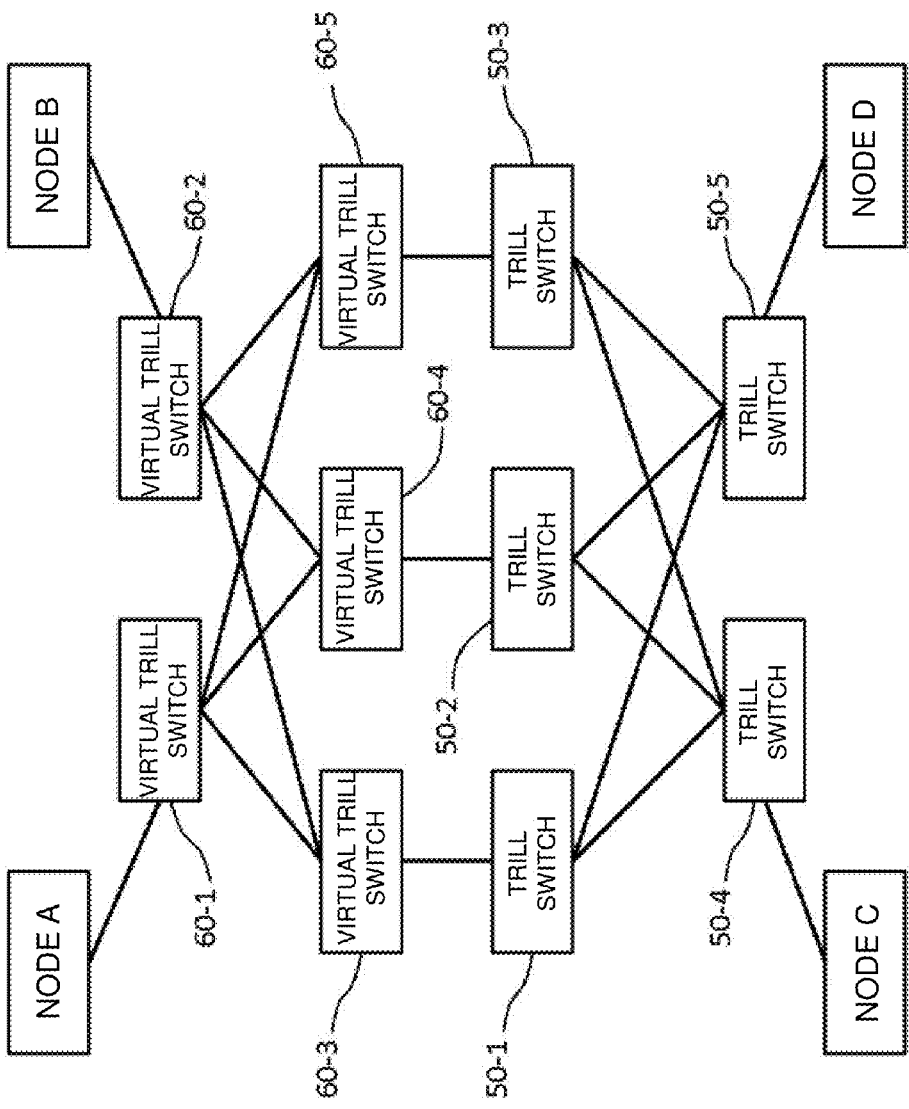
FIG. 8 is a block diagram showing an example of the network topology in which the OpenFlow switches are replaced by a virtual network under an instruction from the integrated controller of the exemplary embodiment 1.

The OpenFlow controller controlling unit 11 then instructs the OpenFlow controller 20 to generate a virtual network, having the topology of FIG. 8 and link costs of FIG. 9, based on the path calculated by the path calculation unit 13 (see FIG. 2(6)).

The virtual network generation unit 22 of the OpenFlow controller 20 generates the virtual network in accordance with the instruction from the integrated controller 10.

The virtual network is formed by a plurality of TRILL switches, as shown in FIG. 8. The virtual TRILL switches are implemented by a software technique within the OpenFlow controller 20.

The virtual TRILL switches are provided with the link cost information, and exchange their link cost information by sending/receiving IS-IS packets between them. There are cases where the virtual TRILL switch is mapped to the OpenFlow switch. In such case, the IS-IS packet is sent to the OpenFlow switch, the virtual TRILL switch is mapped to. In the subject exemplary embodiment, the virtual TRILL switch 60-3 of FIG. 8 is mapped to the OpenFlow switch 40-5. Similarly, the virtual TRILL switch 60-4 of FIG. 8 is mapped to the OpenFlow switch 40-6, and the virtual TRILL switch 60-5 of FIG. 8 is mapped to the OpenFlow switch 40-7. The virtual TRILL switch 60-1 is generated by aggregating the OpenFlow switches 40-1 and 40-3, based on the path calculated by the path calculation unit 13, providing that link costs of the OpenFlow switches are summed together. Similarly, the virtual TRILL switch 60-2 is generated by aggregating the OpenFlow switches 40-2 and 40-4, based on the path calculated by the path calculation unit 13, providing that link costs of the OpenFlow switches are summed together.

If an IS-IS packet has been formed, the virtual TRILL switches 60-3 to 60-5 request the OpenFlow switch controlling unit 21 to transmit the IS-IS packet formed to the OpenFlow switches the virtual TRILL switches are mapped to.

The OpenFlow switch controlling unit 21 transmits the IS-IS packet, along with a send packet message of the OpenFlow protocol ('Packet-Out message' of Non-Patent Literature 2), to the OpenFlow switch 40-5 mapped to the virtual TRILL switch 60-3, as an example. In the send packet message, there is set a send packet request to a physical port of the OpenFlow switch 40-5 the TRILL switch 50-1 is connected to.

Similarly, the OpenFlow switch controlling unit 21 transmits the IS-IS packet, along with the send packet message of the OpenFlow protocol, to the OpenFlow switch 40-6. In the send packet message, there is set a send packet request to a physical port of the OpenFlow switch 40-6 the TRILL switch 50-2 is connected to.

Similarly, the OpenFlow switch controlling unit 21 transmits the IS-IS packet, along with the send packet message of the OpenFlow protocol, to the OpenFlow switch 40-7. In the send packet message, there is set a send packet request to a physical port of the OpenFlow switch 40-7 the TRILL switch 50-3 is connected to.

If a send packet message of the OpenFlow protocol is received from the OpenFlow controller 20, the packet processing unit 41 of the OpenFlow switch 40-5 sends the IS-IS packet to the TRILL switch 50-1 specified by the send packet message.

Similarly, if a send packet message of the OpenFlow protocol is received from the OpenFlow controller 20, the packet processing unit 41 of the OpenFlow switch 40-6 sends the IS-IS packet to the TRILL switch 50-2 specified by the send packet message.

If a send packet message of the OpenFlow protocol is received from the OpenFlow controller 20, the packet processing unit 41 of the OpenFlow switch 40-7 sends the IS-IS packet to the TRILL switch 50-3 specified by the send packet message (see FIG. 2(7)).

If IS-IS packets are received from the OpenFlow switches 40-5 to 40-7, the packet processing units 51 of the TRILL switches 50-1 to 50-3 analyze the IS-IS packets to acquire the information concerning link costs.

The path calculation units 53 of the TRILL switches 50-1 to 50-3 perform path calculations, based on the link costs, to update the forwarding tables 54.

The TRILL switches 50-1 to 50-5 exchange IS-IS packets between them to update their own forwarding tables.

For example, the path calculation unit 53 of the TRILL switch 50-4 stores the information: 'If the destination switch is the virtual TRILL switch 60-1, the next hop is the TRILL switch 50-1', and the information: 'If the destination switch is the virtual TRILL switch 60-2, the next hop is the TRILL switch 50-2', in its forwarding table 54.

The above completes preparations to forward the packet on a path of minimum cost.

If a packet destined for the node A is received from the node C, the TRILL switch 50-4 retrieves its forwarding table 54 to acquire the content that the node A is connected to the virtual TRILL switch 60-1, and the content that the next hop for the case of transmission to the virtual TRILL switch 60-1 is the TRILL switch 50-1.

The encapsulation/decapsulation unit 52 of the TRILL switch 50-4 then encapsulates the packet with the TRILL header and the Ethernet header. The packet processing unit 51 then transmits the so encapsulated packet to the TRILL switch 50-1.

The TRILL switch 50-1 retrieves its own forwarding table 54, and transmits the packet, received from the TRILL switch 50-4, to the virtual TRILL switch 60-3.

By the way, the virtual TRILL switch 60-3 is only imaginary and, in reality, the OpenFlow switch 40-5 receives the packet from the TRILL switch 50-1.

In the OpenFlow switch 40-5, the encapsulation/decapsulation unit 42 decapsulates the packet that has been encapsulated with the Ethernet header and with the TRILL header.

The packet processing unit 41 collates the Ethernet header of the original packet against own flow table and forwards the packet to the destination.

The scheme of forwarding the packet from the node A to the node C on the path of the minimum cost will now be explained.

The TRILL switches 50-1 to 50-3 transmit IS-IS packets to the OpenFlow switches 40-5 to 40-7 as well.

On receipt of the IS-IS packet, the packet processing units 41 of the OpenFlow switches 40-5 to 40-7 transmit the received packets to the OpenFlow controller 20, using the OpenFlow Packet-In messages.

On receipt of the IS-IS packets from the OpenFlow switches 40-5 to 40-7, the OpenFlow switch controlling unit 21 of the OpenFlow controller 20 analyzes the IS-IS packets, and stores the switch information, which has been set in the IS-IS packets, in the switch information memory 23.

On receipt of a packet in which the source MAC address is the MAC address of the node A and the destination MAC address is the MAC address of the node C, the OpenFlow switch controlling unit 21 generates a rule for encapsulation based on the information stored in the switch information memory 23. The content of the rule for encapsulation runs as follows: A TRILL header in which an RBridge nickname of the virtual TRILL switch 60-1 is set as the source RBridge nickname and in which an RBridge nickname of the TRILL switch 50-4 is set as the destination RBridge nickname, is added for the packet received, and an Ethernet header in which a MAC address of the virtual TRILL switch 60-3 is set as a source MAC address and in which a MAC address of the TRILL switch 50-1 is set as a destination MAC address is also added for the packet received.

The OpenFlow switch controlling unit 21 sets the above mentioned rule for encapsulation for the encapsulation/decapsulation unit 42 of the OpenFlow switch 40-5.

The node A then transmits a packet to the node C. The OpenFlow switch 40-5 receives the packet in which a MAC address of the node A has been set as a source MAC address and in which a MAC address of the node C has been set as a destination MAC address.

The encapsulation/decapsulation unit 42 of the OpenFlow switch 40-5 adds a TRILL header and an Ethernet header for the received packet in accordance with the rule for encapsulation. By the way, the TRILL header added is such a one in which the RBridge nickname of the virtual TRILL switch 60-1 is set as the source RBridge nickname and in which the RBridge nickname of the TRILL switch 50-4 is set as the destination RBridge nickname. The Ethernet header added is such a one in which a MAC address of the virtual TRILL switch 60-3 is set as a source MAC address and in which a MAC address of the TRILL switch 50-1 is set as a destination MAC address.

The packet processing unit 41 transmits the encapsulated packet to the TRILL switch 50-1 in accordance with the flow entry that has been set from the controller 20.

The TRILL switch 50-1 references the forwarding table 54, and transmits a packet, received from the OpenFlow switch 40-5, to the TRILL switch 50-4 in accordance with processing by TRILL.

The TRILL switch 50-4 checks to see that the node C, representing the destination MAC address, is connected to no other than the TRILL switch 50-4, and strips off the Ethernet header as well as the TRILL header from the received packet to transmit the packet freed of the headers to the node C.

With the subject exemplary embodiment, described above, it is possible to forward a packet along a path envisaged by the integrated controller even in an environment where there co-exist OpenFlow networks and TRILL networks.

Exemplary Embodiment 2

The above described exemplary embodiment 1 is premised on using the link costs shown in tabular form in FIG. 5 and FIG. 6. It is however also possible to raise the aggregation degree of the virtual network depending on the sorts of the link costs used. In the description to follow, an exemplary embodiment 2 in which the virtual TRILL switches on edges of the virtual network are aggregated will now be explained in detail with reference to the drawings. Since the basic configuration of the subject exemplary embodiment is similar to that of the exemplary embodiment 1, the following explanation will be centered on the point of difference of the subject exemplary embodiment from the exemplary embodiment 1.

Figure 4:
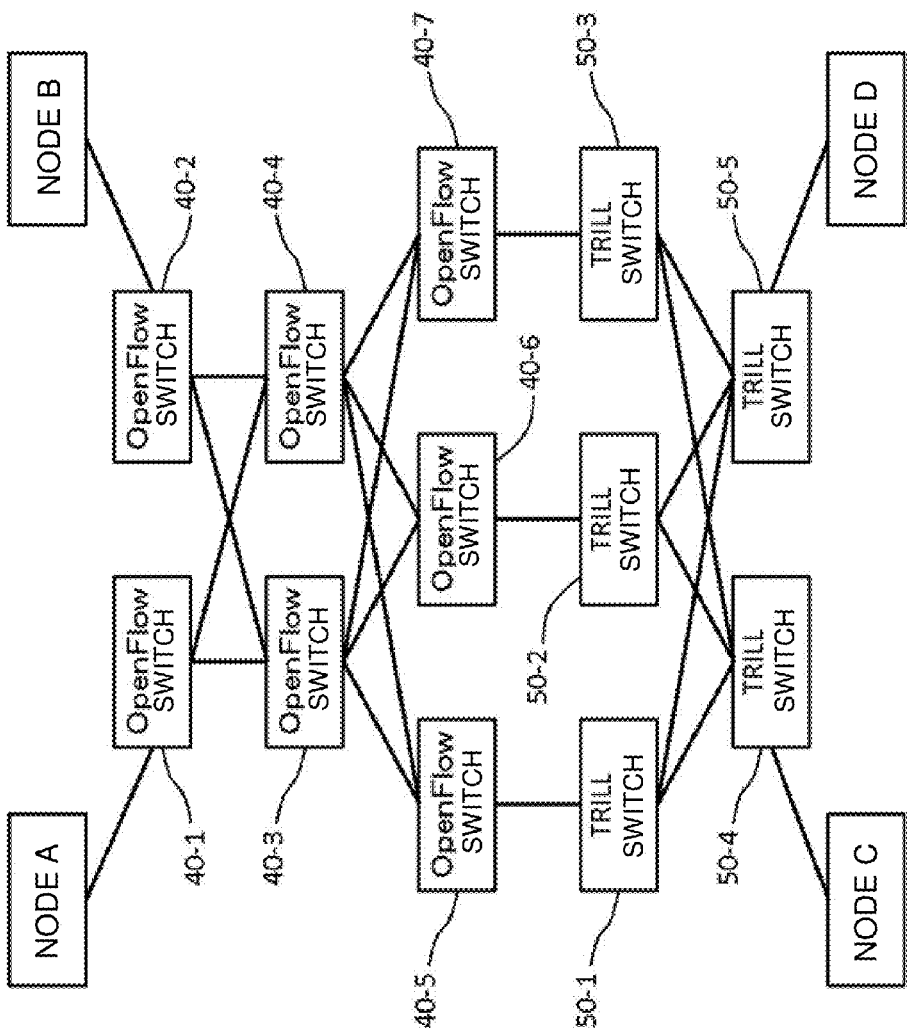
FIG. 4 is a block diagram showing an example of the network topology for illustrating the operation of the communication system according to the exemplary embodiment 1.

FIG. 10 depicts another table showing link costs between two of the OpenFlow switches of FIG. 4. The OpenFlow controller controlling unit 11 of the integrated controller 10 takes link costs, shown in FIG. 10, from the OpenFlow controller 20, and stores them in the switch information memory 14.

The path calculation unit 13 calculates paths of the least costs using the link costs of FIG. 10 stored in the switch information memory 14. In this case, the path of the least costs from the OpenFlow switch 40-1 to the TRILL switch 50-4 is [OpenFlow switch 40-1→OpenFlow switch 40-3→OpenFlow switch 40-5→TRILL switch 50-1→TRILL switch 50-4]. Similarly, the path of the least costs from the OpenFlow switch 40-1 to the TRILL switch 50-5 is [OpenFlow switch 40-1→OpenFlow switch 40-3→OpenFlow switch 40-6→TRILL switch 50-2→TRILL switch 50-5] (see FIG. 11).

The path of the least costs from the OpenFlow switch 40-2 to the TRILL switch 50-4 is [OpenFlow switch 40-2→OpenFlow switch 40-4→OpenFlow switch 40-5→TRILL switch 50-1→TRILL switch 50-4]. Similarly, the path of the least costs from the OpenFlow switch 40-2 to the TRILL switch 50-5 is [OpenFlow switch 40-2→OpenFlow switch 40-4→OpenFlow switch 40-6→TRILL switch 50-2→TRILL switch 50-5] (see FIG. 11).

Figure 11:
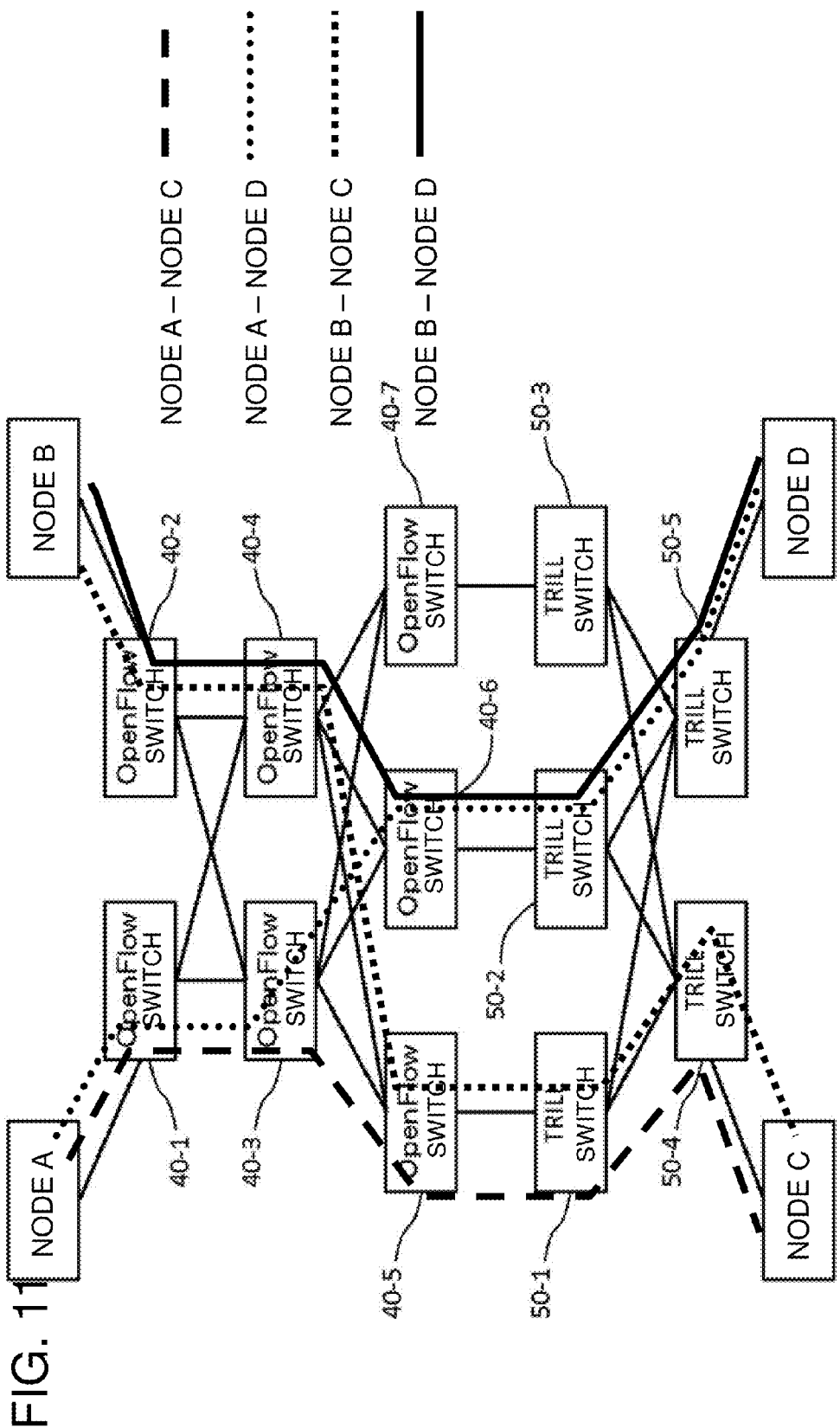
FIG. 11 is a block diagram, shown overlaid on FIG. 4, and showing the least cost paths between nodes derived from the link costs of FIG. 10.

In connection with the above mentioned paths, reference is now made to FIG. 11. The path from the OpenFlow switch 40-1 to the TRILL switch 50-4 (the path from node A to node C) and that from the OpenFlow switch 40-2 to the TRILL switch 50-4 (the path from node B to node C) both traverse the OpenFlow switch 40-5 and the TRILL switch 50-1. On the other hand, the path from the OpenFlow switch 40-1 to the TRILL switch 50-5 (the path from node A to node D) and that from the OpenFlow switch 40-2 to the TRILL switch 50-5 (the path from node B to node D) both traverse the OpenFlow switch 40-6 and the TRILL switch 50-2.

Figure 12:
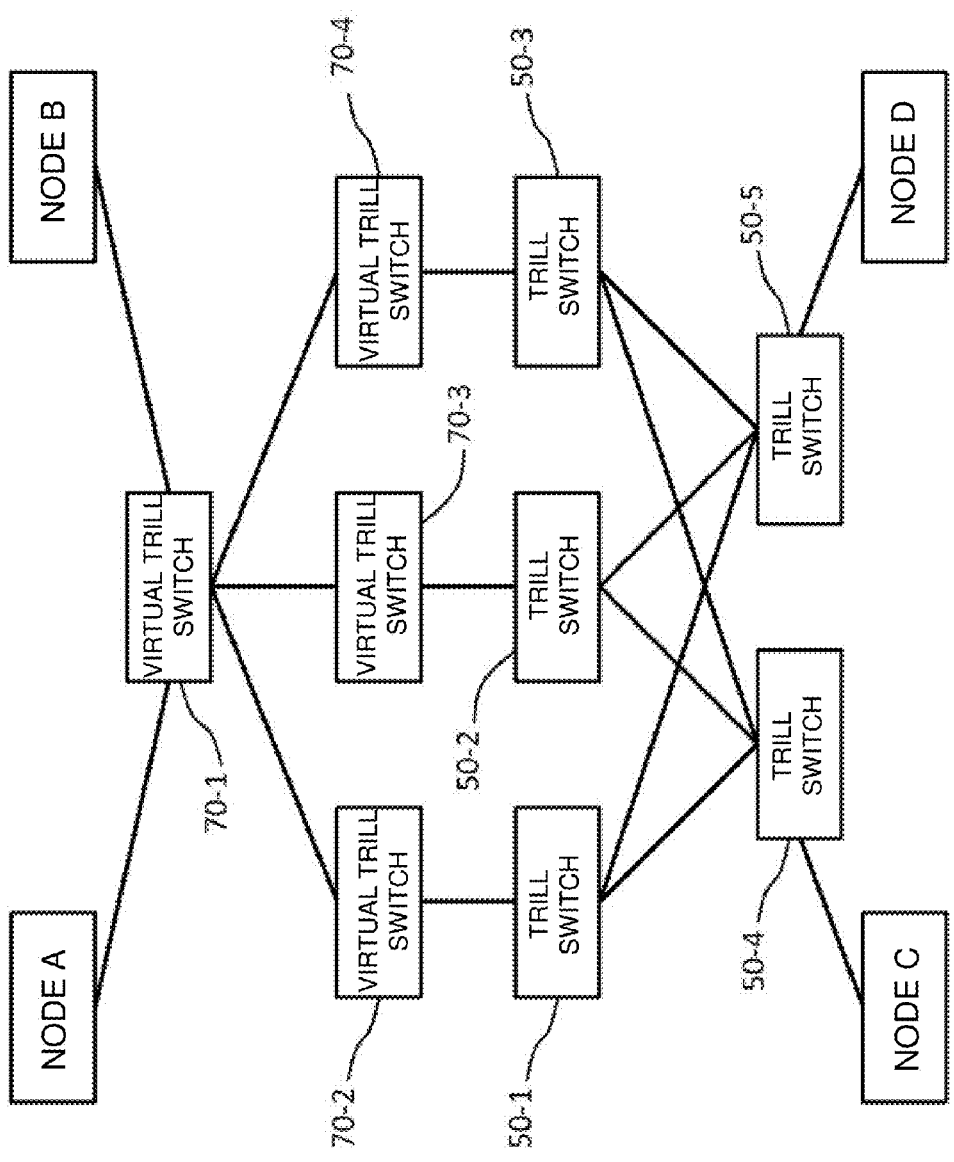
FIG. 12 is a block diagram showing an example of the network topology in which the OpenFlow switches are replaced by a virtual network under an instruction from the integrated controller according to an exemplary embodiment 2.

In such case, the OpenFlow controller controlling unit 11 instructs the OpenFlow controller 20 to generate a virtual network having the topology of the virtual TRILL switches shown in FIG. 12 and the link costs shown in FIG. 13. The OpenFlow switches 40-1 and 40-2 traverse the same neighboring points on the routes to the TRILL switches 50-4 and 50-5, and hence may be aggregated to one virtual TRILL switch in the virtual network.

In the OpenFlow controller 20, the virtual network generation unit 22 generates virtual TRILL switches having the topology of FIG. 12 and the link costs of FIG. 13. The virtual TRILL switch 70-2 is mapped to the OpenFlow switch 40-5, the virtual TRILL switch 70-3 to the OpenFlow switch 40-6 and the virtual TRILL switch 70-4 to the OpenFlow switch 40-7. Also, a virtual TRILL switch 70-1 is generated by aggregating the OpenFlow switches 40-1 to 40-4, based on the concept that it is possible to aggregate the OpenFlow switch 40-1 and the OpenFlow switch 40-2 to form a single switch. By the way, the link costs need to be summed together at this time.

The virtual TRILL switches 70-2 to 70-4 of FIG. 12 request the OpenFlow switch controlling unit 21 to generate the above mentioned IS-IS packet and to transmit the so generated packet to the OpenFlow switches the virtual TRILL switches are mapped to.

The OpenFlow switch controlling unit 21 transmits the above mentioned IS-IS packet to the OpenFlow switches 40-5 to 40-7 along with a send packet request message (Packet-Out message of Non-Patent Literature 2).

In accordance with the send packet request message, the packet processing unit 41 of the OpenFlow switch 40-5 transmits the IS-IS packet, received from the OpenFlow controller 20, to the TRILL switch 50-1. Similarly, the packet processing unit 41 of the OpenFlow switch 40-6 transmits the IS-IS packet, received from the OpenFlow controller 20, to the TRILL switch 50-2, in accordance with the send packet request message, while the packet processing unit 41 of the OpenFlow switch 40-7 transmits the IS-IS packet, received from the OpenFlow controller 20, to the TRILL switch 50-3, again in accordance with the send packet request message.

On receipt of the above mentioned IS-IS packet, the packet processing units 51 of the TRILL switches 50-1 to 50-3 analyze IS-IS packets transmitted from the OpenFlow switches 40-5 to 40-7.

Specifically, the path calculation unit 53 calculates the paths, based on the information that has been set on the IS-IS packet, so as to update the path information of its forwarding table 54.

The above completes the preparations to forward the packet on a path of the least cost.

If the packet processing unit 51 of the TRILL switch 50-4, as an example, then receives from the node C a packet, destined for the node A, the packet processing unit 51 retrieves the forwarding table 54 to check to see that the node A is connected to the virtual TRILL switch 70-1 and that the next hop in case of forwarding to the virtual TRILL switch 70-1 is the TRILL switch 50-1.

The encapsulation/decapsulation unit 52 of the TRILL switch 50-4 encapsulates the received packet by adding a TRILL header and an Ethernet header.

The packet processing unit 51 of the TRILL switch 50-4 transmits the encapsulated packet to the TRILL switch 50-1.

The TRILL switch 50-1 searches its own forwarding table 54 to transmit the packet received from the TRILL switch 50-4 to the virtual TRILL switch 70-2.

By the way, the virtual TRILL switch 70-2 is only imaginary and, in reality, the OpenFlow switch 40-5 receives the packet from the TRILL switch 50-1.

The encapsulation/decapsulation unit 42 of the OpenFlow switch 40-5 reverts the packet, added by the Ethernet header and the TRILL header by way of encapsulation, back to its original state.

The packet processing unit 41 of the OpenFlow switch 40-5 collates the Ethernet header of the original packet to its own flow table to forward the packet to the destination.

As described above, the virtual network can be reduced by aggregation to a proper size based on the link costs and on the results of the path calculations associated with the link costs. With the subject exemplary embodiment, it is possible to obtain an advantage that, as compared to the exemplary embodiment 1, path selection processing in the TRILL switches may be facilitated. This is apparent from the fact that, in the link cost table of FIG. 13, it may readily be seen that the path between the virtual TRILL switches 70-1 and 70-3 is the path of the least cost.

Although a preferred exemplary embodiment of the present invention has been described above, the present invention is not to be restricted to this particular mode, such that further changes, substitutions or adjustments may be made within the range not departing from the basic technical concept of the invention. For example, the configurations of networks or elements, shown in the drawings, are given merely as illustrative to assist in the understanding of the present invention. For example, the configurations of the networks or elements, shown in the drawings, are given merely as examples to assist in understanding of the present invention, which is not to be restricted to the configurations shown therein.

In the above described exemplary embodiments, a configuration comprised of interconnections of the OpenFlow network and the TRILL network has been shown as an example. The present invention may, however, be applied to other combinations of a centralized control network and an autonomously controlled network. For example, the present invention may be applied to a configuration in which the TRILL network in the configuration illustrated herein is replaced by an SPB (Shortest Path Bridging) network as provided for in IEEE802.1aq.

Figure 14:
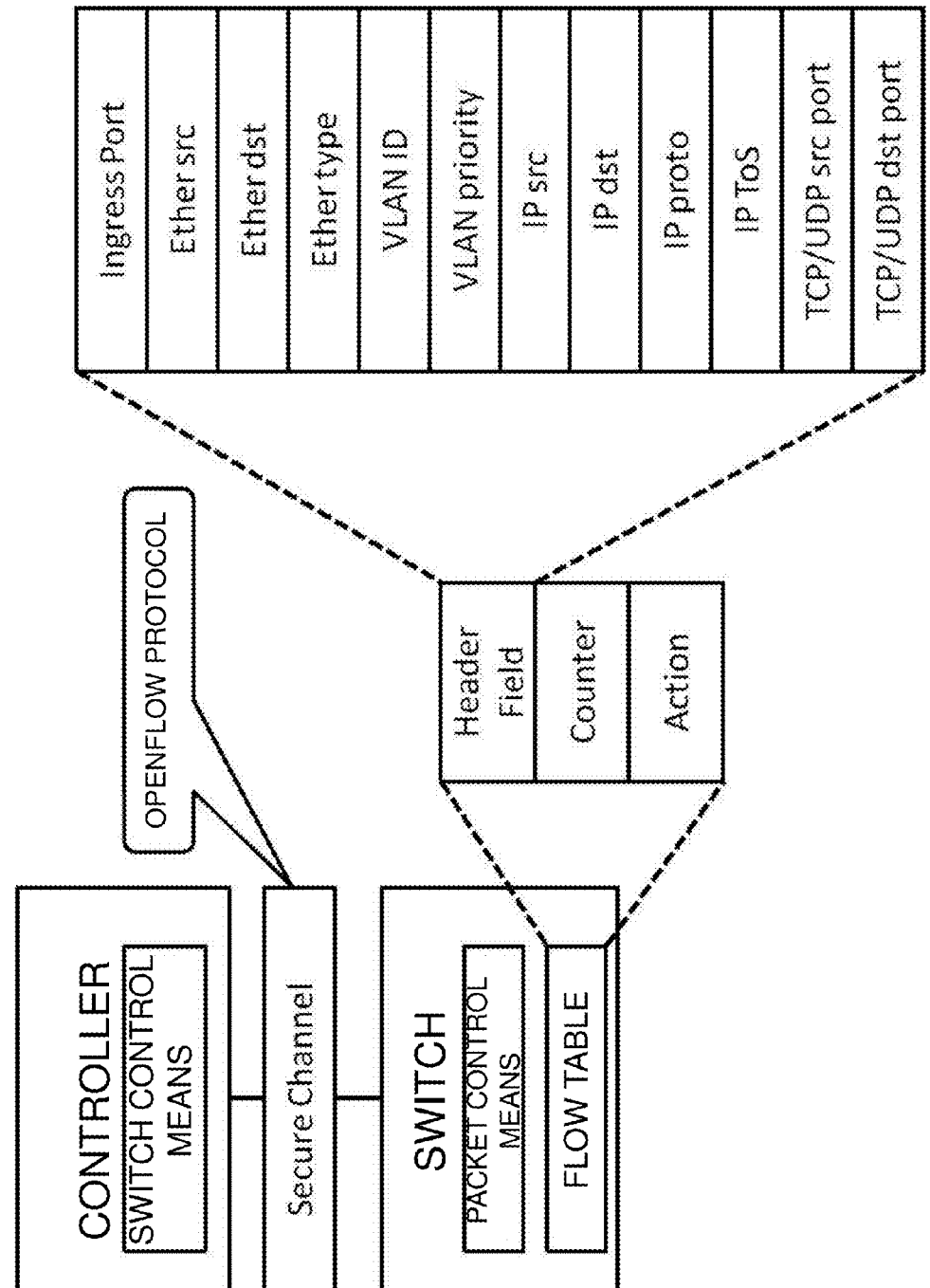
FIG. 14 is a block diagram for illustrating the OpenFlow of Non-Patent Literatures 1, 2.
Figure 15:
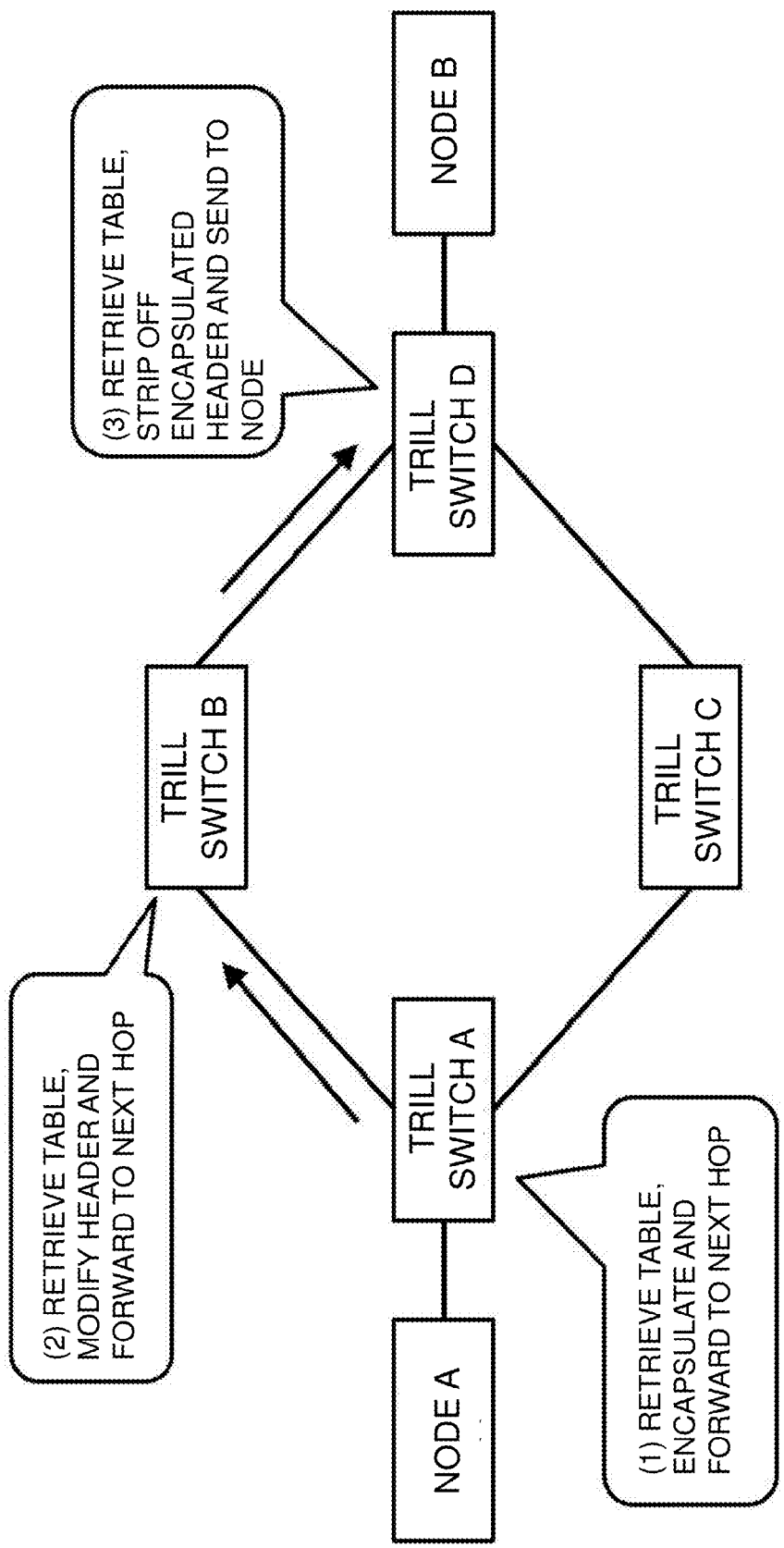
FIG. 15 is a block diagram for illustrating the TRILL of Non-Patent Literature 3.

In the above described exemplary embodiment, the path calculation unit 13 calculates the path of the least cost by relying upon link costs. The path calculated may, however, be other than a path of the least cost. For example, the path of the least cost may be allocated only to specific users and other path sorts may be allocated to other users. Alternatively, not only the link cost but also the information on the flow traffic that may be obtained with the OpenFlow switch (see 'Counters' in FIG. 14) may be taken into account to calculate the paths.

Finally, preferred modes of the present invention will be summarized.

[Mode 1]
(See the communication system according to the first aspect).

[Mode 2]
The communication system according to mode 1, further comprising
a network management apparatus that collects the information of the first switches; wherein,
topological information of a network constituted by the first switches and second switches is collected from the network management apparatus and from the controller to calculate a path extending astride the network constituted by the first and second switches.

[Mode 3]
The communication system according to mode 1 or 2, wherein,
the integrated controller causes the controller to generate a virtual network that is constituted by virtualized switches as the first switch(es) and that reflects link costs between the second switches.

[Mode 4]
The communication system according to any one of modes 1 to 3, wherein,
the second switch is an OpenFlow switch; and wherein,
the integrated controller causes the controller to set a flow entry for the second switches lying on the calculated path to cause the packet to be forwarded along the calculated path.

[Mode 5]
The communication system according to any of modes 1 to 4, wherein,
the first switch(es) is a switch that decides on a path using an IS-IS (Intermediate System to Intermediate System); and wherein,
the integrated controller causes the controller to output an IS-IS packet destined from the second switch to the first switch via the controller so as to allow information exchange to be performed between the first and second switches using the IS-IS.

[Mode 6]
The communication system according to according to mode 5, wherein,
the first switch is a TRILL switch.

[Mode 7]
(See the integrated controller according to the above mentioned second aspect)

[Mode 8]
(See the method for forwarding a packet according to the above mentioned third aspect).

[Mode 9]
(See the program according to the above mentioned fourth aspect).

By the way, the modes 7 to 9 may be extended to the modes 2 to 6, as is the mode 1.

The disclosures of the above mentioned non-Patent Literatures are to be incorporated herein by reference. The exemplary embodiments or Examples may be modified or adjusted within the concept of the total disclosures of the present invention, inclusive of claims, based on the fundamental technical concept of the invention. A series of combinations or selections of elements herein disclosed (elements of claims, Examples and drawings) may be made within the context of the claims of the present invention. That is, the present invention may include a wide variety of changes or corrections that may occur to those skilled in the art in accordance with the total disclosures inclusive of the claims and the drawings as well as the technical concept of the invention. In particular, it should be understood that any optional numerical figures or sub-ranges contained in the ranges of numerical values set out herein ought to be construed to be specifically stated even in the absence of explicit statements.

SYMBOLS 10, 10a integrated controller
11 OpenFlow controller controlling unit
12 SNMP manager controlling unit
13 path calculation unit
14 switch information memory
20 OpenFlow controller
20a controller
21 OpenFlow switch controlling unit
22 virtual network generation unit
23 switch information memory
30 SNMP (Simple Network Management Protocol) manager
31 TRILL switch controlling unit
32 switch information memory
40, 40-1, 40-2 OpenFlow switches
40a second switch
41 packet processing unit
42 encapsulation/decapsulation unit
50, 50-1 to 50-5 TRILL switches
50a first switch
51 packet processing unit
52 encapsulation/decapsulation unit
53 path calculation unit
54 forwarding table
60-1 to 60-5, 70-1 to 70-4 Virtual TRILL switches

What is claimed is:

1. A communication system, comprising:
a first switch that exchanges information with a neighboring switch by a preset routing protocol to form a forwarding table and that references the forwarding table to forward a packet;
a second switch that forwards the packet in accordance with an instruction from a preset controller;
the preset controller that gives the instruction to the second switch; and
an integrated controller that instructs the preset controller to forward the packet along a path specified for the second switch and to generate a virtual network constituted by a virtualized switch as the first switch,
the integrated controller causing information exchange to be performed between the second switch mapped to the virtual network and the first switch by the preset routing protocol to cause the packet to be forwarded along a pre-calculated path,
wherein the first switch is a switch that decides on a path using an IS-IS (Intermediate System to Intermediate System), and
wherein the integrated controller causes the preset controller to output an IS-IS packet destined from the second switch to the first switch so as to allow the information to be exchanged between the first and second switches using the IS-IS.

2. The communication system according to claim 1, further comprising:
a network management apparatus that collects information of the first switch; wherein,
topological information of a network constituted by the first and second switches is collected from the network management apparatus and from the preset controller to calculate a path extending astride the network constituted by the first and second switches.

3. The communication system according to claim 1, wherein,
the integrated controller causes the preset controller to generate the virtual network that is constituted by the virtualized switch as the first switch and that reflects link costs between the second switches.

4. The communication system according to claim 1, wherein,
the second switch is an OpenFlow switch; and wherein,
the integrated controller causes the preset controller to set a flow entry for the second switch located on the calculated path to cause the packet to be forwarded along the calculated path.

5. The communication system according to according to claim 1, wherein,
the first switch is a TRILL switch.

6. An integrated controller configured to:
instruct a preset controller in a network system including a first switch and a second switch, the first switch exchanges information with a neighboring switch by a preset routing protocol to form a forwarding table and references the forwarding table to forward a packet, and the second switch forwards the packet under an instruction from the preset controller,
wherein the integrated controller comprising:
a first unit that instructs the preset controller to forward the packet on a path specified for the second switch;
a second unit that instructs the preset controller to generate a virtual network constituted by a virtualized switch as the first switch; and
a third unit that causes the first switch and the second switch, which is mapped to the virtual network, to perform information exchange by the preset routing protocol so as to cause the packet to be forwarded along a pre-calculated path,
wherein the first switch is a switch that decides on a path using an IS-IS (Intermediate System to Intermediate System); and
wherein the integrated controller causes the preset controller to output an IS-IS packet destined from the second switch to the first switch so as to allow information exchange to be performed between the first and second switches using the IS-IS.

7. The integrated controller according to claim 6, in which the integrated controller collects topological information of the network constituted by the first and second switches from the preset controller and from the network management apparatus that collects information of the first switch; the integrated controller calculating a path astride the networks constituted by the first and second switches.

8. The integrated controller according to claim 6, in which the integrated controller causes the preset controller to generate the virtual network that is constituted by a virtualized switch as the first switch and that reflects link costs between the second switches.

9. The integrated controller according to claim 6, wherein, the second switch is an OpenFlow switch;

the integrated controller causing the preset controller to set flow entries in the second switch located on the calculated path so as to forward the packet along the calculated path.

10. A method for forwarding a packet comprising:
instructing a controller, which instructs a second switch, to forward a packet on a path specified for the second switch and to generate a virtual network; a first switch that exchanges information with a neighboring switch by a preset routing protocol to form a forwarding table and that references the forwarding table to forward a packet, forming a network, and the second switch, forwarding the packet under an instruction from the controller, forming the network; the virtual network being constituted by a virtualized switch as the first switch; and
causing information exchange to be performed by the preset routing protocol between the first switch and the second switch mapped to the virtual network so as to cause the first and second switches to forward the packet along a pre-calculated path,
wherein the first switch is a switch that decides on a path using an IS-IS (Intermediate System to Intermediate System); and
wherein the controller outputs an IS-IS packet destined from the second switch to the first switch so as to allow the information to be exchanged between the first and second switches using the IS-IS.

11. A non-transitory computer-readable recording medium storing a program that causes a computer, which instructs a controller, controlling a second switch, to perform:
a first process of instructing the second switch to forward a packet along a specified path and to generate a virtual network;
a first switch that exchanges information with a neighboring first switch by a preset routing protocol to form a forwarding table and that references the forwarding table to forward a packet, forming a network, and the second switch that forwards the packet under an instruction from the controller, forming the network; the virtual network being constituted by a virtualized switch as the first switch; and
a second process of causing the information to be exchanged by a preset routing protocol between the first switch and the second switch mapped to the virtual network so as to cause the first and second switches to forward the packet along a pre-calculated path,
wherein the first switch is a switch that decides on a path using an IS-IS (Intermediate System to Intermediate System); and
wherein the controller outputs an IS-IS packet destined from the second switch to the first switch so as to allow the information to be exchanged between the first and second switches using the IS-IS.

* * * * *